(12) United States Patent
Gillespie

(10) Patent No.: US 6,588,201 B2
(45) Date of Patent: Jul. 8, 2003

(54) CRANKCASE VENTILATION SYSTEM

(76) Inventor: Gavin McKinley Gillespie, 29420 Plank Rd., Burington, WI (US) 53105

(*) Notice: Subject to any disclaimer, the term of this patent is extended or adjusted under 35 U.S.C. 154(b) by 40 days.

(21) Appl. No.: 09/880,251

(22) Filed: Jun. 14, 2001

(65) Prior Publication Data

US 2002/0002968 A1 Jan. 10, 2002

Related U.S. Application Data

(60) Provisional application No. 60/216,375, filed on Jul. 5, 2000.

(51) Int. Cl.[7] .............................................. F01M 13/00
(52) U.S. Cl. ..................................................... 60/283
(58) Field of Search .............................. 123/41.86, 572, 123/573, 574; 60/283

(56) References Cited

U.S. PATENT DOCUMENTS

| | | | | |
|---|---|---|---|---|
| 3,754,538 A | * | 8/1973 | Ephraim, Jr. et al. | 123/41.86 |
| 3,875,916 A | * | 4/1975 | Patton | 123/41.86 |
| 4,827,715 A | * | 5/1989 | Grant et al. | 60/283 |
| 5,603,290 A | * | 2/1997 | Swain et al. | 123/41.86 |
| 5,669,366 A | * | 9/1997 | Beach et al. | 123/572 |
| 5,803,025 A | * | 9/1998 | Feucht | 60/283 |
| 6,418,712 B2 | * | 7/2002 | Darley | 60/283 |

* cited by examiner

*Primary Examiner*—Marguerite McMahon

(57) ABSTRACT

A motorcycle crankcase ventilation system that makes use of suction pressure generated within the exhaust pipe of a motorcycle exhaust system during operation of a motorcycle engine to draw gases from within the crankcase of the motorcycle for delivery to and ejection through the motorcycle exhaust system. The ventilation system is comprised of a first cylindrical member enclosing a central bore and a port apparatus attached exteriorly to the sidewall of the first cylindrical member. The port apparatus encloses a central bore, which communicates with the central bore of the first cylindrical member. The port apparatus is further comprised of a curved plate, nozzle, collar, and nipple. The first cylindrical member is attached in-line by fastening means to the exhaust pipe of a motorcycle exhaust system, and a hose is attached at a first end to the nipple of the port apparatus and at a second end to the crankcase vent of the motorcycle engine. During operation of the motorcycle, suction pressure within the motorcycle exhaust pipe and first cylindrical member creates vacuum pressure within the port apparatus, which draws crankcase gases through the hose and port apparatus for delivery to the first cylindrical member and ejection though the motorcycle exhaust pipe.

10 Claims, 2 Drawing Sheets

CRANKCASE VENTILATION SYSTEM

This application claims the benefit of provisional application ser. No. 60/216,375 filed Jul. 5, 2000.

BACKGROUND OF THE INVENTION

This version of the invention is concerned with the field of internal combustion engines. More specifically, this version of the invention is concerned with devices that dispose of or ventilate crankcase fumes generated by the internal combustion engine of a motorcycle by means of suction pressure generated by the engine exhaust system of a motorcycle.

1. Prior Art

During operation of the internal combustion engine of a motorcycle, the crankcase thereof collects flammable vapors escaping from the piston cylinders and is subject to an accumulation of internal pressure generated by operation of the engine. These vapors, sometimes referred to as blow-by gases, are comprised of engine lubricating oil (either vaporized or atomized) and unburned carbon particles covered with oil and contribute to sluggish engine performance and premature engine wear, as such excessive crankcase pressure results in weeping engine seals. Various devices have been employed to expel the fumes and lower the pressure within the crankcase in order to prevent an inadvertent ignition of the fumes within the crankcase and to minimize the accumulation of the carbon particles upon the valves, valve seats, interior walls of the intake manifold, and other interior components of the engine. The devices include but are not limited to oil separators, ventilation systems, oil and vapor cleaning and recycling apparatuses, and open filters that vent directly to the atmosphere.

The subject of the instant invention is comprised of a crankcase ventilation system that directs motorcycle crankcase exhaust fumes into the hot exhaust fumes of a motorcycle exhaust system, thereby allowing adequate vacuum pressure to be maintained within the engine crankcase proportionately over a range of engine operation (revolutions per minute), thus resulting in improved engine performance. Furthermore, the injection of crankcase fumes into the hot exhaust gases of a motorcycle exhaust system vaporizes any remaining particulates, producing cleaner exhaust emissions as compared to conventional methods of ventilation (e.g. open filters).

2. Discussion of the Prior Art

Numerous designs for crankcase ventilation and fumes disposal systems have been provided in the prior art. Even though these designs may be suitable for the specific individual purposes to which they address, they would not be suitable for the purposes of the present version of the invention. For instance, U.S. Pat. No. 4,827,715, issued to Grant et al. on May 9, 1989 discloses a crankcase fumes disposal system consisting of a cylindrically shaped conduit that is connected at a first orifice to an exhaust pipe. Crankcase fumes and vapors are delivered to the interior of the conduit by means of a port formed on the sidewall thereof from an oil separator attached to the engine. Tubular members disposed within the conduit direct the oil coated particles and atomized oil escaping from the separator to a path wherein they come into contact with the heated exhaust gases and are vaporized before escaping to the atmosphere. As disclosed, the system is intended for use on heavy equipment and earth moving vehicles.

U.S. Pat. No. 4,881,511, Crankcase Ventilator, issued to Pickering on Nov. 21, 1989 and U.S. Pat. No. 5,494,020, Apparatus For Recycling The Exhaust Gas Of An Engine Crankcase, issued to Meng on Feb. 27, 1996 disclose devices for cleaning and recycling, respectively, automobile exhaust gases.

As illustrated by the background art, efforts are continuously being made in an attempt to develop devices for ventilating and disposing of crankcase vapors and fumes. No prior effort, however, provides the benefits attendant with the present invention in that a motorcycle crankcase ventilation system is furnished to operate primarily with motorcycle engines by employing suction pressure generated by the motorcycle exhaust system to improve the extraction of fumes and vapors from within the crankcase for dispersion into the exhaust system.

As such, it may be appreciated that there is a continuing need for a new and improved crankcase ventilation system for the internal combustion engine of a motorcycle. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

The present version of the invention, which will be described in greater detail hereinafter, relates to the field of internal combustion engines. More specifically, this version of the invention is concerned with devices that dispose of or ventilate crankcase fumes generated by the internal combustion engine of a motorcycle by means of suction pressure generated by the engine exhaust system of a motorcycle. My version of the invention overcomes all of the shortcomings listed previously, in addition to novel aspects that will be described in detail hereinafter.

Described briefly, according to a typical embodiment, the invention presents a crankcase ventilator system designed for use with the exhaust systems of motorcycles, although it is adaptable for use with other vehicles powered by internal combustion engines. The system is comprised of a cylindrical member and a port assembly. The cylindrical member encloses a bore with access thereto gained by orifices or apertures formed at either end of the cylindrical member. The port assembly is constructed of a curved rectangular plate, nozzle, collar, and nipple and is secured to an exterior portion of the cylindrical member by threaded fasteners that are affixed to the cylindrical member and are received by apertures formed within the rectangular plate. The nozzle is attached directly to the plate at an angle and extends beyond the underside of the plate through an aperture formed within the cylindrical member and into the bore.

The ventilation system is attached to the exhaust system by securing a first end of the cylindrical member to the end of an exhaust pipe and the opposing end of the cylindrical member to the remainder of the exhaust pipe or tail pipe. The unattached end of a hose secured to an existing crankcase ventilation system is affixed to the nipple. As the engine operates, the passage of exhaust gases through the exhaust pipe creates suction pressure, which draws crankcase vapors and fumes through the hose and nozzle into the cylindrical member for ejection through the exhaust tail pipe. As the motor speed (i.e. rotation of the crankcase) increases, suction pressure is increased proportionately in order to compensate for increased crankcase pressure and production of fumes and vapors.

My invention, therefore, resides not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

OBJECTS OF THE INVENTION

Accordingly, it is an object of my version of the invention to provide a low-cost, easy-to-manufacture, and easy-to-market motorcycle crankcase ventilation system.

A further object of my version of the invention is to provide an easy-to-use and versatile motorcycle crankcase ventilation system designed for use primarily with motorcycles and secondarily with other vehicles powered by internal combustion engines.

A significant object of the invention is to provide a motorcycle crankcase ventilation system that is comprised of a hollow cylindrical member and a port assembly affixed thereon, the port assembly comprised of an attachment plate, nozzle, collar, and nipple.

A final but very significant object of the invention is to provide a motorcycle crankcase ventilation system that improves the operation of existing crankcase fume and vapor ventilation systems by the use of suction pressure generated by the engine exhaust system of a motorcycle.

For a better understanding of the invention, its operating advantages and the specific objects attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention illustrated by the accompanying drawings.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

Figure 1:
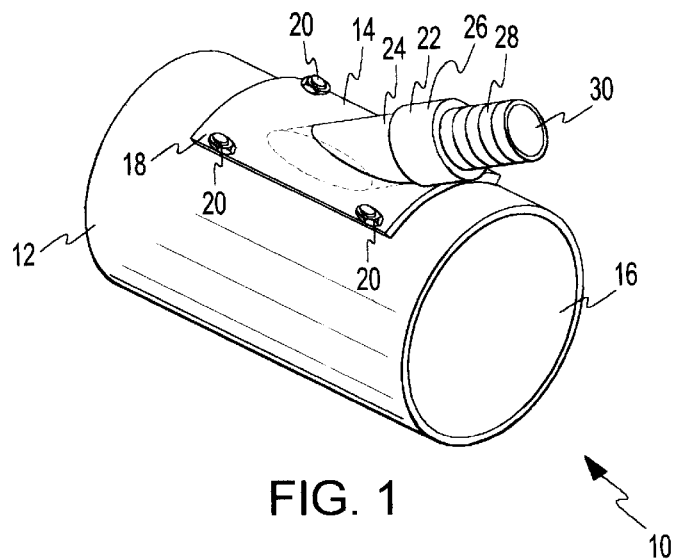
FIG. 1 is a perspective view of a motorcycle crankcase ventilation system in accordance with the present version of the invention.
Figure 2:
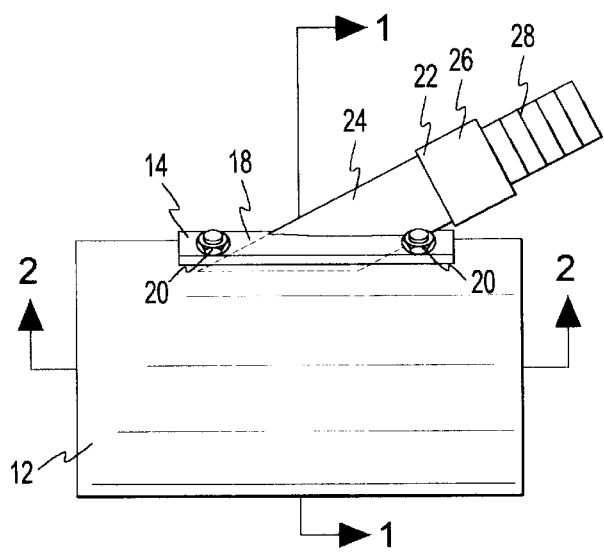
FIG. 2 is an elevation view of a motorcycle crankcase ventilation system in accordance with the present version of the invention.
Figure 3:
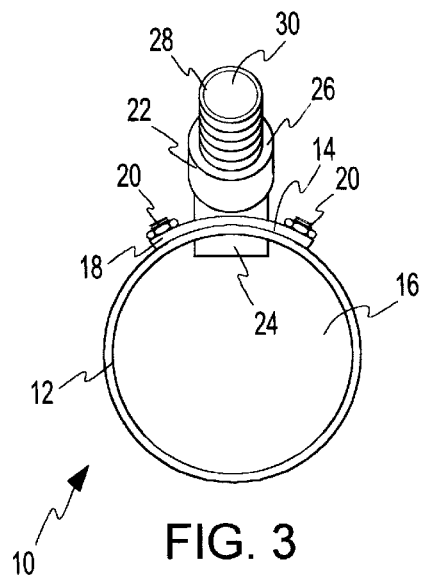
FIG. 3 is an elevation view of a motorcycle crankcase ventilation system according to line 1—1 of FIG. 2.
Figure 4:
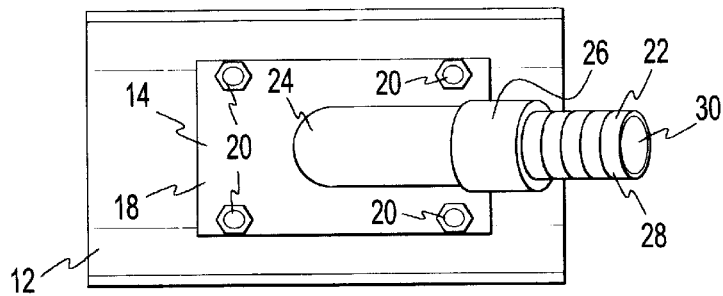
FIG. 4 is a plan view of a motorcycle crankcase ventilation system according to line 2—2 of FIG. 2.

| DRAWING REFERENCE NUMERALS | |
|---|---|
| 10 | Motorcycle Crankcase Ventilation System |
| 12 | First Cylindrical Member |
| 14 | Port Apparatus |
| 16 | Bore |
| 18 | Plate |
| 20 | Fasteners |
| 22 | Second Cylindrical Member |
| 24 | Nozzle |
| 26 | Collar |
| 28 | Nipple |
| 30 | Bore |
| 32 | Hose |
| 34a, b | Exhaust Pipe |
| 36 | Fasteners |

DETAILED DESCRIPTION OF THE PREFERRED EMBODIMENT

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to the drawings and, in particular, to FIG. 1–FIG. 4 wherein there are illustrated a typical embodiment of the motorcycle crankcase ventilation system 10. The present version of the invention 10 is designed to improve the operation and efficiency of existing crankcase ventilation systems installed on motorcycles and other vehicles by use of suction pressure generated by the vehicle's engine exhaust system. The system 10 is comprised generally of a hollow first cylindrical member 12 and port apparatus 14. The first cylindrical member 12 encloses a bore 16 with access thereto gained by apertures formed at either end of the first cylindrical member 12 and contains an aperture formed within the side wall thereof over which the port apparatus 14 is secured to the cylindrical member 12. The cylindrical member 12 may be provided in a variety of dimensions and sizes in order to ensure secure attachment to the exhaust pipe system of a motorcycle. The port apparatus 14 is affixed to the first cylindrical member 12 by a rectangular attachment plate 18 that is curved to conform to the outer surface of the side wall of the first cylindrical member 12. The port apparatus 14 is secured to the first cylindrical member 12 by threaded fasteners 20, part of which are joined to the first cylindrical member 12 and received by apertures formed within the plate 18.

A second cylindrical member 22, which is disposed at X angle in relation to the first cylindrical member 12, is comprised of a nozzle 24, collar 26, and nipple 28. A central bore 30 extends through the components 24, 26, 28 of the second cylindrical member 22 so that the bore 30 communicates with the bore 16 of the first cylindrical member 12. As shown, most clearly in FIG. 3, the nozzle 24 extends for some distance through the aperture formed within the side wall of the first cylindrical member 12 and is secured thereto proximate to a first end thereof. The nozzle 24 is connected at a second end to the collar 26, which is connected at an opposing end to the nipple 28. The nipple 28 is constructed in part with a series of annular ridges formed onto the exterior surface of the side wall thereof. The first cylindrical member 12 and port apparatus 14 are constructed of material that is lightweight, resistant to heat, corrosion, and oxidization, durable, and economical to acquire and manufacture, such as aluminum, various other metals and the like.

Figure 5:
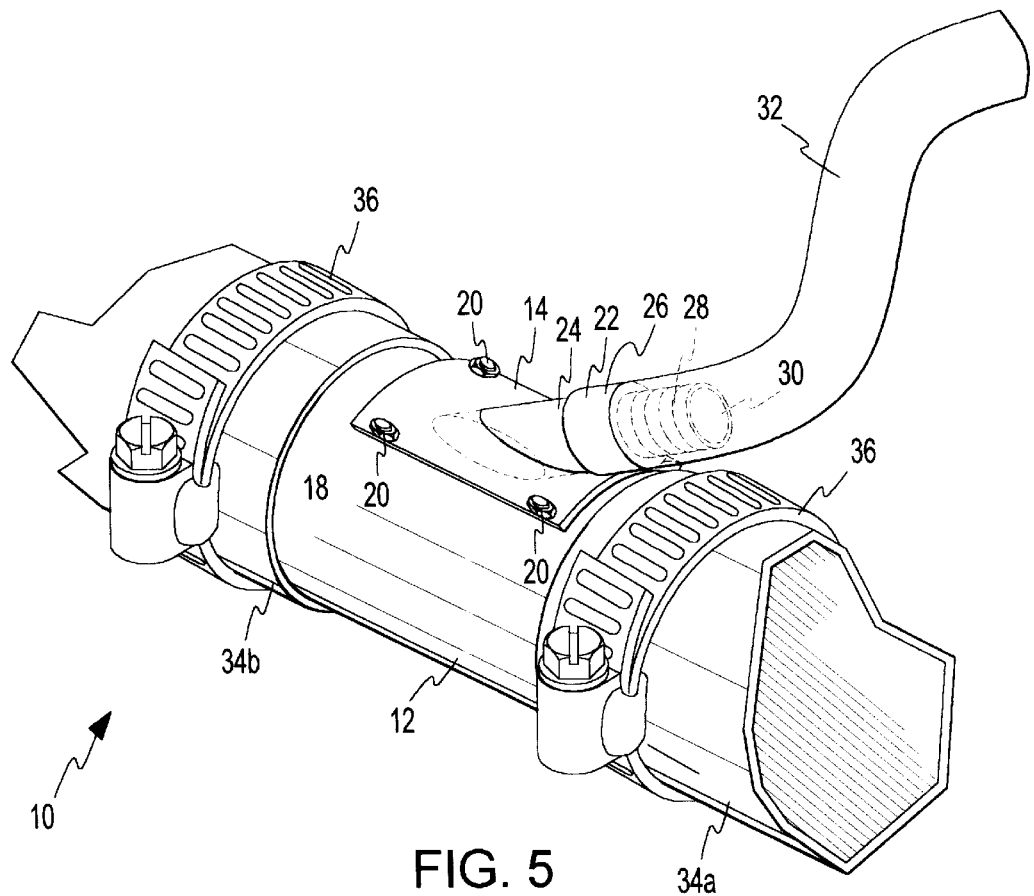
FIG. 5 is a perspective view of a motorcycle crankcase ventilation system attached in an inline manner to a motorcycle exhaust system.

Referring to FIG. 5, therein illustrated is the motorcycle crankcase ventilation system 10 attached to the exhaust pipe 34a, b of a motorcycle. One end of a flexible hose 32, which is attached at a distal end to an existing crankcase ventilation system, is secured to the nipple 28. An end of the first cylindrical member 12 is attached to the end of an exhaust pipe 34a and an opposing end of the first cylindrical member 12 is affixed to a second section of the exhaust pipe 34b or tail pipe. Clamp fasteners 36 positioned around the ends of the exhaust pipe 34a, b sections fasten the first cylindrical member 12 and sections of exhaust pipe 34a, b to each other. It should be pointed out that the type of fastener 36 illustrated is used by way of example for purposes of this discussion and that other methods of attachment, such as threaded fasteners extending through apertures formed in the exhaust pipe 34a, b sections and first cylindrical member 12, annular flanges receiving threaded fasteners, and the like may be used and remain within the spirit and scope of this version of the invention 10.

During operation of the vehicle, exhaust gases flow from a first exhaust pipe 34a section attached to an exhaust manifold into the first cylindrical member 12 and out into a second exhaust pipe section 34b or tail pipe. The velocity of exhaust flow creates suction pressure, which creates vacuum pressure within the bore of the components 24, 26, 28 of the second cylindrical member 22, thereby drawing crankcase fumes and vapors through the hose 32, albeit at a rate or velocity faster than would otherwise occur, into the first cylindrical member 12 for ejection through the second exhaust pipe section 34b or tail pipe. The amount of suction pressure generated is proportionate to the speed (revolutions per minute of engine crankshaft) of the engine and the resulting volume of fumes and vapors and pressure produced within the crankcase. As a result of enhanced crankcase ventilation, the engine achieves quicker throttle response, lower operating temperatures, and more efficient performance of internal components.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

CONCLUSION AND SCOPE OF INVENTION

From the foregoing, it will be understood by persons skilled in the art that an improved motorcycle crankcase ventilation system has been provided. The invention is relatively simple and easy to manufacture, yet affords a variety of uses. While my description contains many specificities, these should not be construed as limitations on the scope of the version of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A motorcycle crankcase ventilation system comprising:
   (a) a first cylindrical member enclosing a central bore; and
   (b) a curved plate, and
   (c) a second cylindrical member connected to the curved plate; and
   (d) a nozzle; and
   (e) a collar; and
   (f) a nipple; and
   (g) a port apparatus comprising a curved plate, and a second cylindrical member connected to the curved plate, wherein the second cylindrical member comprises a nozzle, a collar, and a nipple, said port apparatus enclosing a central bore and located on the exterior of the first cylindrical member, the bore of the port apparatus communicating with the bore of the first cylindrical member;

wherein the first cylindrical member is connected in-line by fastening means to the exhaust pipe of a motorcycle exhaust system;

wherein the port apparatus is releasable attached to a first end of a hose, the hose connected at a second end to a ventilating port of a motorcycle crankcase;

wherein during operation of a motorcycle engine exhaust gasses passing through the first cylindrical member produce suction pressure, thereby creating vacuum pressure within the port apparatus and drawing crankcase exhaust gasses through the hose and into the port apparatus and the first cylindrical member for mixing with motorcycle exhaust pipe gasses and ejection through the motorcycle exhaust pipe.

2. The motorcycle crankcase ventilation system as recited in claim 1, wherein an aperture is located medially within the sidewall of the first cylindrical member.

3. The motorcycle crankcase ventilation system as recited in claim 2, wherein an aperture is located medially within the curved plate.

4. The motorcycle crankcase ventilation system as recited in claim 2, wherein the second cylindrical member encloses the central bore of the port apparatus.

5. The motorcycle crankcase ventilation system as recited in claim 2, wherein the curved plate is attached to the exterior sidewall of the first cylindrical member over the aperture of the first cylindrical member.

6. The motorcycle crankcase ventilation system as recited in claim 1, wherein the nozzle is connected at a first end to the curved plate and at a second end to the collar.

7. The motorcycle crankcase ventilation system as recited in claim 6, wherein the nozzle extends for some distance beyond the side of the curved plate opposite to which the nozzle is attached.

8. The motorcycle crankcase ventilation system as recited in claim 1, wherein the collar is connected at a first end to the nozzle and at a second end to the nipple.

9. The motorcycle crankcase ventilation system as recited in claim 1, wherein the nipple is connected at a first end to the collar and is releasably attached at a second end to the hose.

10. The motorcycle crankcase ventilation system as recited in claim 9, wherein annular ridges are located on the exterior of the nipple.

* * * * *